United States Patent [19]

Prissok et al.

[11] Patent Number: 5,484,827
[45] Date of Patent: Jan. 16, 1996

[54] UV-STABILIZER CONCENTRATES BASED ON TPU, A PROCESS FOR THEIR PRODUCTION AND UTILIZATION

[75] Inventors: Frank Prissok; Friedhelm Lehrich, both of Lemfoerde; Gerhard Lehr, Schwegenheim; Aleksander Glinka, Osnabrück; Douglas J. Harrop, Hüde, all of Germany

[73] Assignee: BASF Elastogran GmbH, Germany

[21] Appl. No.: 315,732

[22] Filed: Sep. 30, 1994

Related U.S. Application Data

[63] Continuation of Ser. No. 42,960, Apr. 5, 1993.

[30] Foreign Application Priority Data

Apr. 4, 1992 [DE] Germany .................. 42 11 355.0

[51] Int. Cl.⁶ ................................................. C08K 5/34
[52] U.S. Cl. ..................... 524/86; 524/101; 524/186; 524/189; 524/190; 524/191; 524/198; 524/507; 524/589
[58] Field of Search ............... 524/86, 101, 186, 524/189, 190, 191, 198, 507, 589

[56] References Cited

U.S. PATENT DOCUMENTS

| | | | |
|---|---|---|---|
| 3,523,984 | 8/1970 | Clas . | |
| 4,319,016 | 3/1982 | Kurobe et al. | 528/127 |
| 4,524,166 | 6/1985 | Spivack et al. | 528/72 |
| 4,935,275 | 6/1990 | Ushida et al. . | |
| 5,145,893 | 9/1992 | Galbo et al. | 528/73 |

FOREIGN PATENT DOCUMENTS

| | | |
|---|---|---|
| 262527 | 4/1988 | European Pat. Off. . |
| 2901774 | 7/1980 | German Dem. Rep. . |
| 238992 | 9/1986 | German Dem. Rep. . |

OTHER PUBLICATIONS

W. Goyert and H. Hespe, TPU Properties and Applications, Plastics 68 (1978), pp. 819FF.
Advances in Urethane Science and Technology, vol. 4, pp. 68 FF, and vol. 6, pp. 103 FF; Technomeric Publishing Comp.

*Primary Examiner*—James J. Seidleck
*Assistant Examiner*—John M. Cooney, Jr.
*Attorney, Agent, or Firm*—Mary E. Golota

[57] ABSTRACT

The invention provides UV-stabilizer concentrates, which, relative to the total weight, consist of A) 40 to 80 weight-% of at least one thermoplastic polyurethane
B) 10 to 30 weight-% 1,3,5-tri-glycidyl-isocyanurate and
C) 10 to 30 weight-% 2-(2-hydroxy-3,5,-di-tert-amyl-phenyl)-2H-benzotriazole and/or 1,6-hexane-di-yl-bis-(3-(3-benzotriazole-N-yl)-4-hydroxy-5-tert-butyl)-phenyl-propanoate.

The invention also discloses a process for their production, and their utilization to stabilize TPU against UV- and thermal-degradation.

9 Claims, No Drawings

UV-STABILIZER CONCENTRATES BASED ON TPU, A PROCESS FOR THEIR PRODUCTION AND UTILIZATION

This is a continuation of application Ser. No. 08/042,960 filed Apr. 5, 1993.

DESCRIPTION

The subjects of the invention are UV-stabilizer concentrates, which, relative to the total weight, consist of A) 40 to 80 weight-% of at least one thermoplastic polyurethane B) 10 to 30 weight-% 1,3,5-tri-glycidyl-isocyanurate and C) 10 to 30 weight-% 2-(2-hydroxy-3,5,-di-tert-amyl-phenyl)-2H-benzotriazole and/or 1,6-hexane-di-yl-bis-(3-(3-benzotriazole-N-yl)-4-hydroxy-5-tert-butyl)-phenyl-propanoate.

The invention further provides a process for their production and their utilization.

Cellular or compact polyurethane (PU) poured elastomers and thermoplastic polyurethanes, abbreviated TPU, have been known for a long time from numerous patent and literature publications. Their technical importance is based on the combination of high-grade mechanical properties with the advantages of economical processing methods. By using various chemical structural components in different mass ratios, thermoplastically processable or cross-linked, compact, or cellular PU elastomers can be produced, which differ greatly as regards their processability and their mechanical properties. A survey of PU elastomers, their properties, and their application is found e.g. in the Plastics Manual, Volume 7, Polyurethanes, First Edition, 1966, edited by Dr. R. Vieweg and Dr. A. Höchtlen, and the Second Edition, 1983, edited by Dr. G. Oertel (Carl-Hanser Publishing Company, Munich, Vienna).

PU poured elastomers can be obtained by introducing, e.g. by pouring or injecting, a reaction mixture into an open or closed mold tool and hardening it.

TPUs can be produced continuously or discontinuously according to various methods. As the most familiar ones, the so-called belt method and the extruder method are also used technically.

According to the GB-A-1 057 018, a pre-polymer is produced from an essentially linear poly-hydroxyl compound and excess organic diisocyanate. This pre-polymer is conducted through a metering pump to a mixing head, where it is mixed with a certain amount of diol having a low molecular weight. The resulting reaction mixture is placed on a conveyor belt and is conducted through a furnace heated to 70° to 130° C., until it solidifies. The reaction product is then fragmented, is tempered at temperatures up to 120° C. for 6 to 40 hours, and thus can be processed into molded bodies, e.g. with injection molding machines.

With the extruder method, which is described, e.g. in the DE-A-20 59 570 (U.S. Pat. No. 3,642,964), the structural components are introduced directly into the extruder, and the reaction in the extruder is carried out under specific process condition. The resulting PU elastomer is brought over into the thermoplastic state and is extruded as strands, is cooled in an inert gas atmosphere until is solidifies, and is fragmented. A disadvantage of this method is that the resulting TPU is not suited for fabricating films or fine profiles and hoses. TPUs of the same composition are transparent if they are produced by the extruder process, while the ones produced by the belt process have an opaque appearance. Opaque TPUs can be processed into films which exhibit no blocking, while transparent TPUs are unsuited for this.

Well-known structural components, preferably di-functional structural components, can be used to produce the TPU. The following can be cited as examples: poly-hydroxyl compounds with a higher molecular weight, which form the so-called soft phase, e.g. poly-oxy-alkylene glycols, such as poly-oxy-propylene-, poly-oxy-ethylene-, poly-oxy-propylene-poly-oxy-ethylene-, poly-oxy-butylene-, poly-oxy-butylene-poly-oxy-ethylene- or poly-oxy-butylene-poly-oxy-propylene-glycols or poly-ester-dioles, such as alkane-diol-poly-adipates, aromatic or aliphatic di-isocyanates, such as e.g. 4,4'-diphenyl-methane-di-isocyanates (MDI) or 1,6-hexa-methylene-di-isocyanates (HDI) and chain-lengtheners with a low molecular weight to form the hard segments, e.g. alkane-diols or di-alkylene-glycols such as e.g. 1,4-butane-diol or di-ethylene glycol.

Unstabilized PU elastomers are quite sensitive to heat and UV radiation, since they tend to oxidation reactions. The main reaction centers for the decomposition of PU elastomers based on polyether and polyester-polyols are urethane bonds, especially if an aromatic di-isocyanate is used, and, in the case of polyester-PU-elastomers, the ester bond, which is hydrolyzed essentially by protons. The composition here can speed up auto-catalytically, as is also the case for the ether bond in polyether PU elastomers, which is oxidized to peroxide groups in the presence of air.

To avoid these disadvantages, stabilizers are incorporated into the PU elastomers or into the structural components which are used to produce them. For example, carbo-di-imides (W. Goyert and H. Hespe, TPU Properties and Applications; Plastics 68 (1978), pages 819 ff) have proven themselves as anti-hydrolysis agents. Anti-oxidants such as, e.g., 4,4'-thio-bis(3-methyl-6-tert-butyl-phenol), pheno-thiazine and 2,2-thio-bis-(4-methyl-6-iso-bornyl-phenol) are described as suitable stabilizers against thermal oxidation. Examples of UV stabilizers are substituted resorcines, salicylates, benzotriazoles, and benzophenones. Furthermore, stabilizer combinations are used which consist of a UV stabilizer and an anti-oxidant, e.g. consisting of 2-(2'-hydroxy-3',5'-di-tert-amyl)-benzotriazole and tetrakis-[methylene-3-(3',5'-di-tert-butyl-4'-hydroxy-phenyl)-propionate]-methane (Advances in Urethane Science and Technology, Volume 4, pages 68 ff, and Volume 6, pages 103 ff; Technomic Publishing Company). According to statements in the DD-A-238 992, epoxied synthetic products, such as epoxied triglycerides, alkyl-epoxy-stearate, -phthalate, -tetra-hydrophthalate or epoxied natural products such as epoxied soybean oil, beet oil, rape oil, etc. are used as hydrolysis stabilizers for PU elastomers based on polyester polyols. According to the statements in the EP-A-262 527 (U.S. Pat. No. 4,775,558) cellular polyurethanes which are compounded or finished with other materials, such as e.g. PVC, ABS, co- and homo-polymers of vinyl chloride, styrene, butadiene, isoprene, chloroprene, ethylene, propene, or acryl-nitrile, poly-vinyl acetate, or poly-vinyl butyral, can sometimes be stabilized against thermolysis and contact discoloration by adding epoxides, preferably higher functional epoxides with an epoxide equivalent weight of 57 to 10,000. Plastics with better mechanical properties can be obtained by adding epoxides to produce PU elastomers by applying polyurethanes on epoxide materials or by mixing polyurethanes with epoxide resins. Although the mechanical properties of the produced PU elastomers can be considerably improved by adding stabilizers, very often these still do not meet the stringent mechanical requirements demanded of them, especially for special fields of application.

As has already been explained, the stabilizers are generally incorporated into the starting materials for producing the PU elastomers, i.e. the PU elastomers are produced in the presence of the stabilizers. However, according to the statements in the DE-A-29 01 774, in place of the stabilizers, one can also use pourable, microbe-resistant dye concentrates and/or concentrates of auxiliary substances, on the basis of PU elastomers, which contain up to 70 weight-% of a dye and/or auxiliary agent. To produce these concentrates, structural components for forming the TPU are likewise reacted in the presence of the dye and/or auxiliary agents. A disadvantage of this mode of production is that the dyes or auxiliary agents can sometimes be decomposed under the reaction conditions, inasmuch as they have bonded reactive residues with NCO-groups, a reaction with the poly-isocyanates exists, and the homogeneous distribution of larger quantities of dye or auxiliary agent in the PU elastomer concentrate is not always guaranteed.

It is an object of the present invention to further improve the stabilization of PU elastomers, preferably TPU, against mechanical degradation and discoloration by heat and UV radiation.

Surprisingly, this object can be achieved by using a stabilizer concentrate consisting of selected stabilizers.

The subject of the invention therefore is UV stabilizer concentrate which, relative to the total weight, consist of A) 40 to 80 weight-%, preferably 70 to 80 weight-%, of at least one TPU B) 10 to 30 weight-%, preferably 10 to 15 weight-%, of 1,3,5-tri-glycidyl-isocyanurate and C) 10 to 30 weight-%, preferably 10 to 15 weight-%, of 1,6-hexane-di-yl-bis-(3-(3-benzotriazole-N-yl)-4-hydroxy-5-tert-butyl)-phenyl-propanoate or preferably 2-(2-hydroxy-3,5,-di-tert-amyl-phenyl)-2H-benzotriazole, or mixtures thereof.

Analogously to well-known glycidyl compounds, 1,3,5-tri-glycidyl-isocyanurate increases the hydrolysis stability of PU elastomers. By using this compound in combination with 1,6-hexane-di-yl-bis-(3-(3-benzotriazole-N-yl)-4-hydroxy-5-tert-butyl)-phenyl-propanoate or preferably 2-(2-hydroxy-3,5,-di-tert-amyl-phenyl)-2H-benzotriazole in the form of the inventive UV stabilizer concentrate, the stability of TPU against heat and especially against UV radiation is improved synergistically. The UV stabilizer concentrate can be produced easily, can be readily metered, and is easy to handle.

So that the stabilizing effect of the UV stabilizer concentrates will not be impaired by the PU elastomers matrix, it is appropriate to use for its production TPUs (A) with a hardness in the range of Shore A 78 to Shore A 98, which corresponds to a hardness of Shore D 64, preferably with a hardness of Shore A 85 to A 90. These are obtained by the reaction a) of an inorganic di-isocyanate, preferably 4,4'-diphenyl-methane-di-isocyanate with b) a poly-hydroxy compound with a molecular weight of 800 to 3,000 from the group of the poly-oxy-butylene glycols, poly-butanediol-1,4-adipates, poly-hexanediol-1,6-adipates, and poly-butanediol-1,4-hexanediol-1,6-adipate and c) an alkane-diol with two to six carbon atoms, preferably four to six carbon atoms, especially butane-diol-1,4 as chain lengthening means.

TPUs (A) produced by the belt method have especially proven themselves in the production of the inventive UV stabilizer concentrates.

The stabilizers (B) and (C) are used in the above percentage range suitably in a weight ratio of 0.95:1.10 to 1.10:0.95 and preferably 1:1.

The UV stabilizer concentrate consisting of

A) 75 weight-% of at least one TPU

B) 12.5 weight-% 1,3,5-tri-glycidyl-isocyanurate and

C) 12.5 weight-% 2-(2-hydroxy-3,5,-di-tert-amyl-phenyl)-2H-benzotriazole prove especially easy to handle from a production engineering point of view and consequently is used especially widely.

To produce the inventive UV stabilizer concentrates, the stabilizers (B) and (C) are sequentially or preferably simultaneously incorporated into the completely reacted, at least flowable, preferably molten TPU (A) at a temperature of 170° to 220° C. preferably 180° to 200° C. The following can be mentioned as examples of processing apparatuses which are suited for this: rolling mills, kneading machines, and preferably extruders, especially twin-screw extruders. The resulting UV stabilizer concentrates can then be put into intermediate storage or can be granulated directly. The granulate particles here suitably have an average particle diameter less than 6 mm, preferably 2 to 4 mm.

The inventive UV stabilizer concentrates are used to stabilize well-known TPUs, produced by the extruder or belt methods from customary input materials, against UV- and thermal-degradation.

For this purpose, the UV stabilizer concentrates are intensely mixed in an amount of 1 to 12 parts by weight preferably 2 to 10 parts by weight, and especially 3 to 6 parts by weight per 100 parts per weight of TPU, preferably in the form of granulates, at temperatures from 10° to 220° C. The mixture of stabilizer concentrate and TPU is then processed thermoplastically at temperatures from 170° to 220° C., preferably 180° to 210° C., e.g. by the blow process to form films or by the injection molding process to form molded bodies. According to another processing variant, the UV stabilizer concentrates can also be introduced directly into the TPU melt, e.g. by means of an extruder, can be mixed homogeneously, and can be extruded to from a molded body.

To stabilize thermoplastic polyether-PU-elastomers, it has here proven advantageous to use UV stabilizer concentrate whose TPU (A) soft segments consists of a poly-oxy-butylene-glycol residue, and, in analogous fashion to stabilize thermoplastic polyester PU elastomers, to use UV stabilizer concentrates in which the TPU (A), as a soft segment, contains a bound poly-alkene-diol-adipate residue.

EXAMPLES

Production of the inventive UV stabilizer concentrates

Example 1

75 parts by weight of a TPU with a hardness of Shore A 85 is obtained by the belt method by reacting 1000 parts by weight of a poly-oxy-butylene-glycol with a molecular weight of 1000, 600 parts by weight 4,4'-diphenyl-methane-di-isocyanate and 125 parts by weight butane-diol-1,4.

This was melted in an extruder and was intensively mixed at 220° C. with 12.5 weight-% 1,3,5-tri-glycidyl-isocyanurate and 12.5 weight-% 2-(2-hydroxy-3,5,-di-tert-amyl-phenyl)-2H-benzotriazole.

The homogeneous mixture was extruded and granulated.

Example 2

75 parts by weight of a TPU with a hardness of Shore A 54 is obtained by the belt method by reacting 1000 parts by weight of a poly-butane-diol-1,4-adipate with a molecular weight of 1000, 750 parts by weight 4,4'-diphenyl-methane-di-isocyanate and 218 parts by weight butane-diol-1,4.

This was melted in an extruder and was intensively mixed at 210° C. with 12.5 weight-% 1,3,5-tri-glycidyl-isocyanurate and 12.5 weight-% 1,6-hexane-di-yl-bis-(3-(3-benzotriazole-N-yl)-4-hydroxy-5-tert-butyl)-phenyl-propanoate.

The homogeneous mixture was extruded and granulated.

Stabilization of TPU

Example 3

A TPU granulate was produced by the belt method by reacting 1000 parts by weight of a poly-oxy-butylene-glycol with a molecular weight of 1000, 600 parts by weight 4,4'-diphenyl-methane-di-isocyanate 126 parts by weight butane-diol-1,4 and relative to the total weight it contained 1 weight-% tetrakis-[methylene-(3,5-di-tert-butyl-4-hydroxyhydro-cinnamate]-methane.

It was melted in an extruder at 190° C., was homogeneously mixed with 4 weight-% of the UV stabilizer concentrate of Example 1, and the reaction mixture was injection molded to form test bodies.

Measurements on the resulting test bodies showed the optical and mechanical properties quoted in Table 1.

Comparison examples I and II

The procedure was analogous to that of Example 3, but the following was used in place of the UV stabilizer concentrate:

0.5 weight-% 1,3,5-tri-glycidyl-isocyanurate, called TGIC for short in Table 1

0.5 weight-% 2-(2-hydroxy-3,5,-di-tert-amyl-phenyl)-2H-benzotriazole, called HPB for short in Table 1.

The optical and mechanical properties measured on the resulting test bodies are compiled in Table 1.

TABLE 1

Elastogran Polyurethane GmbH

| Example | Stabilizer | Discoloration after 100 hours UV illumination according to DIN 75 202 | | Mechanical properties after 500 hours tempering at 100° C. | | |
| --- | --- | --- | --- | --- | --- | --- |
| | | [1]Delta E* according to CIE LAB | [1]YI* Yellowness Index | Tensile strength according to DIN 53 504 [n/mm$^2$] | Elongation on rupture according to DIN 53 504 [%] | Tear propagation strength according to DIN 53 515 [N/mm$^2$] |
| 3 | UV stabilizer concentrate according to Example 1 | 0.7 | 15.0 | 29 | 740 | 44 |
| Comparison examples | | | | | | |
| I | TGIC | 3.5 | 20.1 | 20 | 560 | 39 |
| II | HPB | 5.3 | 18.8 | 14 | 500 | 38 |
| | none | 10.5 | 32.0 | 14 | 720 | 36 |

[1]Large delta E*- and YI-values exhibit strong discoloration

Example 4

The procedure was analogous to that of Example 3, but a TPU was used with a Shore hardness D of 56, produced by the reaction of 1000 parts by weight of a poly-butane-diol-1,4-adipate with a molecular weight of 1000, 750 parts by weight 4,4'-diphenyl-methane-di-isocyanate and 218 parts by weight butane-diol-1,4 and 8 weight-% of the UV stabilizer concentrate of Example 2.

The discoloration measured on the fabricated test bodies after UV illumination is given in Table 2.

Example 5

The procedure was analogous to that of Example 3, but a TPU was used with a Shore hardness D of 60, produced by the reaction of 1000 parts by weight of a poly-butane-diol-1,4-adipate with a molecular weight of 2500, 880 parts by weight 4,4'-diphenyl-methane-di-isocyanate and 278 parts by weight butane-diol-1,4 and 8 weight-% of the UV stabilizer concentrate of Example 2.

The discoloration measured on the fabricated test bodies after UV illumination is given in Table 2.

TABLE 2

Elastogran Polyurethane GmbH
Discoloration of the TPUs after UV illumination according to DIN 75 202

| Example | | Delta E* according to CIE LAB[1] | |
|---|---|---|---|
| | | 100 hours or | 300 hours UV illumination |
| 4 | TPU with UV stabilizer concentrate | 8.9 | 11.8 |
|   | TPU without UV stabilizer concentrate | 28.4 | 39.2 |
| 5 | TPU with UV stabilizer concentrate | 10.7 | 18.8 |
|   | TPU without UV stabilizer concentrate | 31.2 | 41.1 |

[1]Large delta E*- and YI-values exhibit strong discoloration

We claim:

1. A UV-stabilizer concentrate, consisting of, relative to the total weight,

A) 40 to 80 weight-% of at least one thermoplastic polyurethane

B) 10 to 30 weight-% 1,3,5-tri-glycidyl-isocyanurate and

C) 10 to 30 weight-% 2-(2-hydroxy-3,5,-di-tert-amyl-phenyl)-2H-benzotriazole and/or 1,6-hexane-di-yl-bis-(3-(3-benzotriazole-N-yl)-4-hydroxy-5-tert-butyl)-phenyl-propanoate.

2. The UV stabilizer concentrate according to claim 1, wherein the structural component (C) consists of 2-(2-hydroxy-3,5,-di-tert-amyl-phenyl)-2H-benztriazole.

3. The UV stabilizer concentrate according to claim 1, containing the stabilizers 1,3,5-tri-glycidyl-isocyanate (B) and 2-(2-hydroxy-3,5,-di-tert-amyl-phenyl)-2H-benztriazole or 1,6-hexane-di-yl-bis-(3-(3-benzotriazole-N-yl)-4-hydroxy-5-tert-butyl)-phenyl-propanoate (C) in a weight ratio of 1:1.

4. The UV stabilizer concentrate according to claim 1, consisting of

A) 75 weight-% of at least one thermoplastic polyurethane

B) 12.5 weight-% 1,3,5-tri-glycidyl-isocyanurate and

C) 12.5 weight-% 2-(2-hydroxy-3,5,-di-tert-amyl-phenyl)-2H-benztriazole.

5. The UV stabilizer concentrate according to claim 1, wherein the thermoplastic polyurethanes (A) have a hardness in the range of Shore A 78 to Shore A 98, and are produced by the reaction a) of an organic di-isocyanate with b) a poly-hydroxy compound with a molecular weight of 800 to 3,000 from the group of the poly-oxy-butylene glycols, poly-butanediol-1,4-adipates, poly-hexanediol-1,6-adipates, and poly-butanediol-1,4-hexanediol-1,6-adipate and c) an alkane-diol with two to six carbon atoms as chain lengthening means.

6. The UV stabilizer concentrate according to claim 1, wherein the thermoplastic polyurethanes (A) have a hardness in the range of Shore A 78 to Shore A 98, and are produced according to the belt process, by the reaction a) of 4,4'-diphenyl-methane-di-isocyanate with b) a poly-hydroxy compound with a molecular weight of 800 to 3,000 from the group of the poly-oxy-butylene glycols, poly-butanediol-1,4-adipates, poly-hexanediol-1,6-adipates, and poly-butanediol-1,4-hexanediol-1,6-adipate and c) butane-diol-1,4 as chain lengthening means.

7. A process for producing the UV stabilizer concentrates of claim 1, wherein the stabilizers (B) and (C) are incorporated into the melted, completely reacted thermoplastic polyurethane at a temperature of 170° to 220° C.

8. A method of improving the resistance of thermoplastic polyurethanes against UV- and thermal-degradation comprising incorporating a sufficient-amount of the UV stabilizer concentrates of claim 1 into one or more thermoplastic polyurethanes.

9. The method of claim 10 further comprising incorporating 1 to 12 parts by weight of the UV stabilizer of claim 1, per 100 parts by weight of the one or more thermoplastic polyurethanes.

* * * * *